United States Patent
Chaudhri

(10) Patent No.: US 8,032,565 B2
(45) Date of Patent: *Oct. 4, 2011

(54) AUTOMATED CREATION OF MEDIA ASSET ILLUSTRATIONS

(75) Inventor: Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/694,170

(22) Filed: Jan. 26, 2010

(65) Prior Publication Data

US 2010/0131833 A1 May 27, 2010

Related U.S. Application Data

(63) Continuation of application No. 11/650,857, filed on Jan. 7, 2007, now Pat. No. 7,685,163.

(51) Int. Cl.
*G06F 17/30* (2006.01)
(52) U.S. Cl. ........ 707/804; 715/253; 715/274; 715/275; 715/277
(58) Field of Classification Search .................. 715/253, 715/274, 275, 277; 707/804
See application file for complete search history.

(56) References Cited

U.S. PATENT DOCUMENTS

| | | | |
|---|---|---|---|
| 6,748,382 B1 * | 6/2004 | Mohan et al. | 1/1 |
| 7,213,036 B2 | 5/2007 | Apparao et al. | |
| 7,305,436 B2 | 12/2007 | Willis | |
| 7,346,668 B2 | 3/2008 | Willis | |
| 7,370,276 B2 | 5/2008 | Willis | |
| 7,478,323 B2 * | 1/2009 | Dowdy | 715/253 |
| 7,685,163 B2 | 3/2010 | Chaudhri | |
| 2005/0278377 A1 | 12/2005 | Mirrashidi et al. | |
| 2006/0089949 A1 | 4/2006 | Robbin et al. | |
| 2006/0123052 A1 | 6/2006 | Robbin et al. | |
| 2006/0155914 A1 | 7/2006 | Jobs et al. | |
| 2006/0206811 A1 | 9/2006 | Dowdy | |
| 2006/0247980 A1 | 11/2006 | Mirrashidi et al. | |
| 2007/0192818 A1 * | 8/2007 | Bourges-Sevenier et al. | 725/132 |

OTHER PUBLICATIONS

U.S. Appl. No. 11/519,460, entitled "Media Manager with Integrated Browsers", filed Sep. 11, 2006.
Office Action for U.S. Appl. No. 11/650,857, mailed Mar. 31, 2009.

* cited by examiner

*Primary Examiner* — Jean M Corrielus

(57) ABSTRACT

The invention pertains to techniques for creating media asset illustrations for media assets are disclosed. The created media asset illustrations are useful for media assets that lack associated media asset illustrations. The techniques can analyze media asset data or media asset metadata when creating the create media asset illustrations. The created media asset illustrations can, for example, be used while playing, browsing or displaying associated media assets.

20 Claims, 10 Drawing Sheets

AUTOMATED CREATION OF MEDIA ASSET ILLUSTRATIONS

CROSS-REFERENCE TO RELATED APPLICATION

This application is a continuation of U.S. application Ser. No. 11/650,857, filed Jan. 7, 2007now U.S. Pat. No. 7,685,163, and entitled "Automated Creation of Media Asset Illustrations," which is hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND OF THE INVENTION

1. Field of the Invention

In general, the invention relates to media management applications, and, more particularly, to using a media management application to create media asset illustrations for media assets.

2. Description of the Related Art

Traditionally, music has been purchased at music stores or music departments of larger stores. A consumer will visit the music store or department and manually browse for albums or compact discs (CDs) of interest. After the consumer selects an album or CD of interest, the consumer proceeds to a checkout register to pay for the album or CD being purchased.

In recent years music delivery or distribution over the Internet has become popular. Due to the advances in efficient file formats, such as MP3 and MPEG4, the size of media files has become small enough to make their download via the Internet practical. Also, technological advances have led to higher-speed Internet connections and lower cost of memory. The combination of these advances make downloading media files, such as for music and videos, manageable and not too time consuming.

One popular approach to online music distribution is Apple Computer's iTunes® online music store. Consumers may use the iTunes® online music store to purchase music either as individual music tracks or in albums of songs.

Often, when a consumer purchases a media asset such as a music track, the media asset includes a media asset illustration (e.g., a computer graphic representing an album cover). Traditionally, album cover art has been used by music listeners to identify music albums by sight. The media asset illustration can be displayed while the media asset is playing, for instance, on the display screen of a music player. For example, the iPod®, produced by Apple Computer of Cupertino, Calif., allows a user to display a media asset illustration (e.g., album cover art) associated with a particular audio track while the track is playing.

Unfortunately, not all media assets have associated media asset illustrations. The reason for a missing media asset illustration can vary, but can include unavailability, file corruption, or accidental deletion. Alternately, a media illustration can be missing if the media asset is taken from a user's personal music collection (e.g., 'ripped' from a Compact Disk (CD).) Also, although it is sometimes possible to download media asset illustrations online, if a user does not have a network connection available, media asset illustrations will not be available.

Thus, there is a need to obtain media asset illustrations for those media assets that do not have associated media asset illustrations.

SUMMARY OF THE INVENTION

The invention pertains to techniques for creating media asset illustrations for media assets. These created media asset illustrations are useful for media assets that lack associated media asset illustrations. For example, the created media asset illustrations can serve as substitute media asset illustrations that are used in place of a missing or unavailable media asset illustrations. These techniques can analyze media asset data or media asset metadata when creating the create media asset illustrations. The created media asset illustrations can, for example, be used while playing, browsing or displaying associated media assets.

The invention can be implemented in numerous ways, including as a method, system, device, apparatus, graphical user interface, or computer readable medium. Several embodiments of the invention are discussed below.

In one embodiment of the invention, a media asset illustration is produced by determining if a media asset contains a media asset illustration, creating a media asset illustration for the media asset, and associating the created media asset illustration with the selected media asset. The media asset illustrations can be laid out according to predetermined genre or artist classifications and can include text, graphics, album cover art or other images associated with a media asset, such as promotional photographs or logos. These illustrations may be contained within individual media assets (e.g., a graphic file contained in the headers of a music file) or may be separate from the associated media assets.

In another embodiment of the invention, the production of a media asset illustration can further involve analyzing the media asset metadata contained in the media asset (e.g., ID3 tags). Still another embodiment involves creating a media asset illustration based on the analysis of the media asset data. In yet another embodiment of the invention, production of a media asset illustration is deterministic, creating predictable illustrations according to set design criteria.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to techniques for creating media asset illustrations for media assets. These created media asset illustrations are useful for media assets that lack associated media asset illustrations. For example, the created media asset illustrations can serve as substitute media asset illustrations that are used in place of a missing or unavailable media asset illustrations. These techniques can analyze media asset data or media asset metadata when creating the create media asset illustrations. The created media asset illustrations can, for example, be used while playing, browsing or displaying associated media assets.

Generally, a media asset illustration is a computer graphic that is associated with a particular media asset or group of media assets. For example, many music files (e.g., MP3 or AAC files) have album cover art embedded in the headers of the music file. Also, motion picture, television, and music video files can have promotional stills or movie poster art embedded within the files. In some embodiments of the invention, the aforementioned media asset illustrations are contained within individual media assets. In these embodiments, media asset illustrations can be stored in the file headers of a particular media asset.

Figure 1:
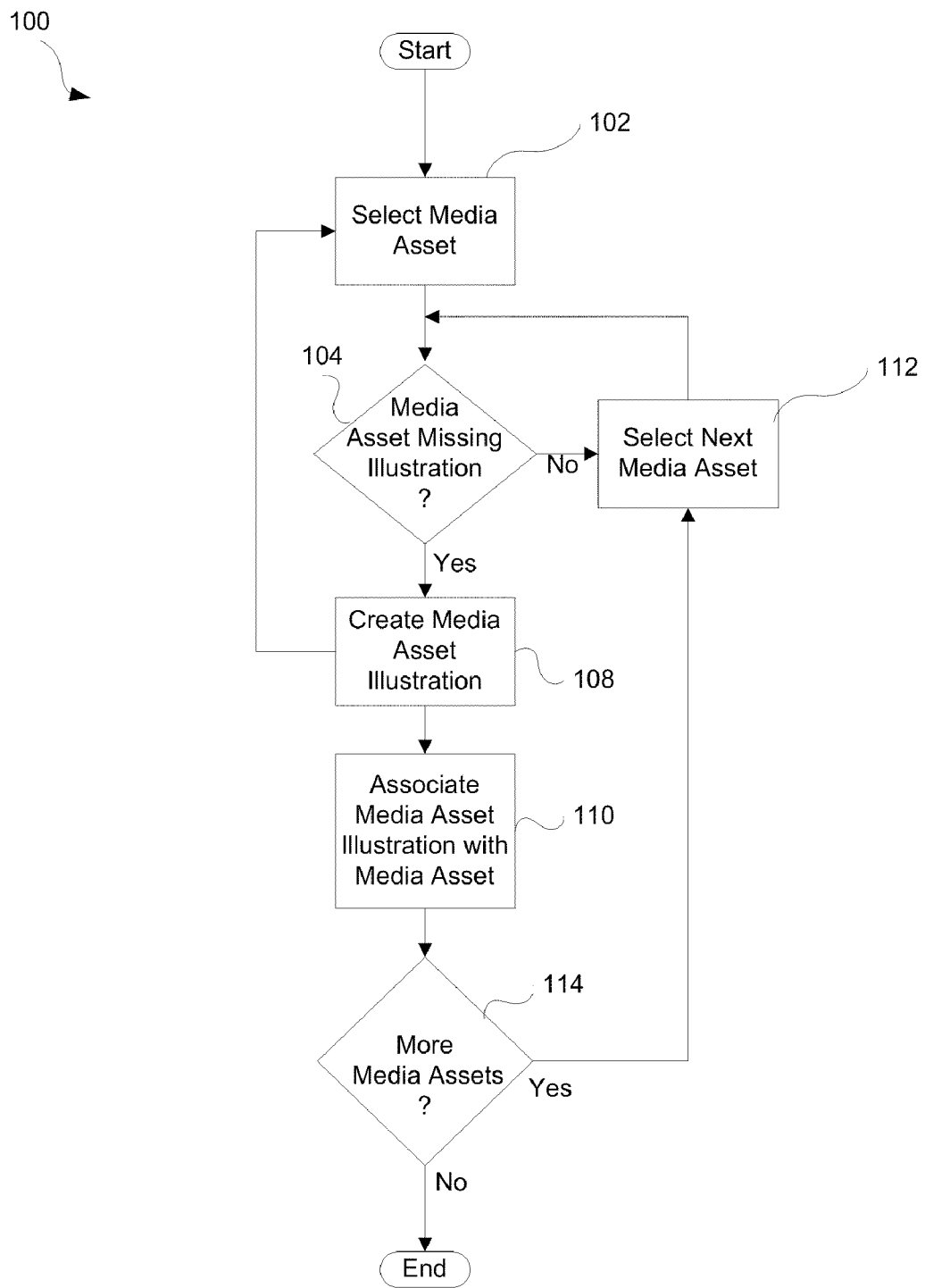
FIG. 1 is a flow diagram of a substitute media asset illustration creation process according to one embodiment of the invention.

According to one embodiment of the invention, if a media asset does not include an associated media asset illustration, a media asset illustration can be generated. FIG. 1 is a flow diagram of a substitute media asset illustration creation process 100 according to one embodiment of the invention. The media asset creation process 100 can be used with media management application, such as iTunes® media management program from Apple Computer, Inc., in order to provide media asset illustrations for media files that do not already have an associated media asset illustration.

The substitute media asset illustration creation process 100 begins with selecting 102 a media asset from a collection of media assets. This collection can be, for example, a collection of media assets (e.g., music files). Next, a decision 104 determines if the selected media asset has an associated media asset illustration. For example, in the case of a music file (e.g., an MP3 or AAC file), the media asset illustration may be embedded in the headers of the music file. The media asset illustration may be a JPEG or other digital graphical format, typically a digital image of an album cover, a movie or TV show promotional poster, a video game package, or a DVD jacket. When the media asset is a music file, the media asset illustration can be an image of cover art (e.g., image of CD jewel case artwork or LP record jacket sleeve). If the decision 104 determines that the media asset does not have an associated media asset illustration, then the substitute media asset illustration process 100 creates 108 a media asset illustration and associates 110 the created media asset illustration with that media asset. The association 110 may involve embedding the media asset illustration into the media asset (e.g., in the ID3 tags of an MP3) or, alternately, can include creating a software pointer linking the media asset to the created media asset illustration.

Next, a decision 114 determines if there are any more media assets to be examined. If so, the substitute media asset illustration creation process 100 continues to block 112 and subsequent blocks. If not, the substitute media asset illustration creation process 100 ends.

If the decision 104 determines that the selected media asset already has a media asset illustration, then the substitute media asset illustration creation process 100 continues by selecting 112 the next media asset in the collection and returning to repeat block 104 and subsequent blocks.

Figure 2:
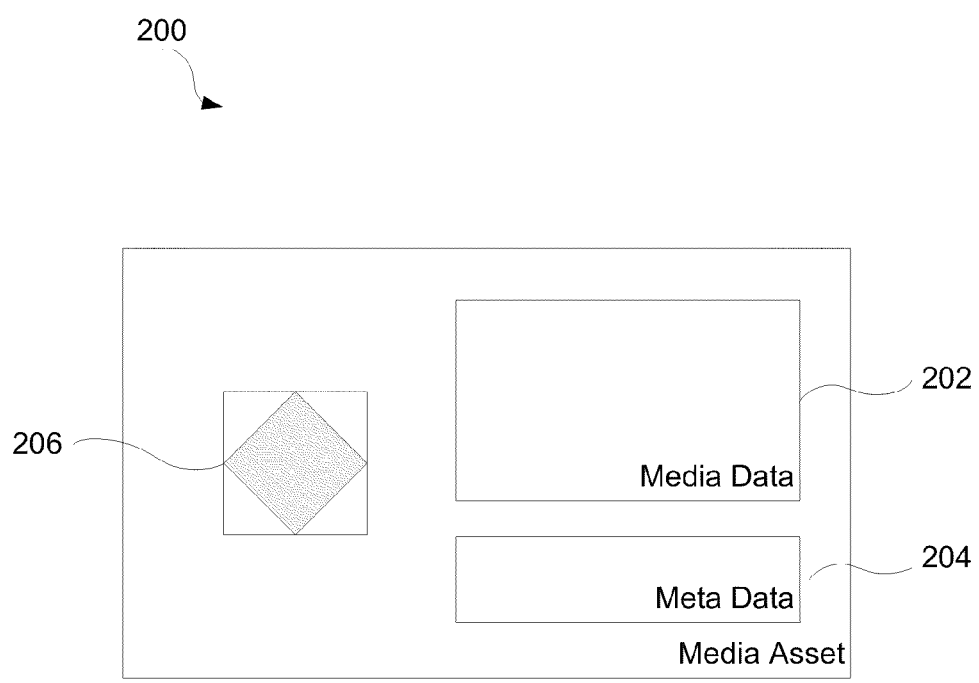
FIG. 2 is a diagram of a media asset according to one embodiment of the invention.

FIG. 2 is a diagram of a media asset 200 according to one embodiment of the invention. Media Asset 200 can be any digital media asset, including but not limited to, an audio file such as an MP3 file or an AAC file, a video file such as an AVI or Quicktime® file, a text file, a picture file such as a JPEG or GIF file, or an electronic book.

The media asset 200 shown contains one or more data segments, including a data segment containing metadata 204, which includes information about the media asset. For example, a MP3 file has ID3 tags containing information about the file including title, artist, and composition (e.g., song) title. The media asset 200 also contains a data segment containing media content 202. The media content 202 is the actual media file data, containing media in a format that can be read by a media player such as a portable media player (e.g., an iPod®) or a media management application (e.g., iTunes®). Examples of media data formats are MP3, AAC, MP3, Quicktime®, as well as others.

Further, the media asset 200 has a data segment containing a media asset illustration 206. Note that the media asset illustration 206 can also be a separate file. The media asset illustration 206 is an electronic graphic file such as a JPEG or GIF file. Further, the media asset illustration 206 can be a visual or marketing representation of the media asset 200, such as a digital image of an album cover, a promotional poster, or DVD jacket. When the media asset 200 is a music file (e.g., an MP3 or AAC file), the media asset illustration 206 can be an image of CD jewel case artwork or LP record jacket sleeve.

Figure 3:
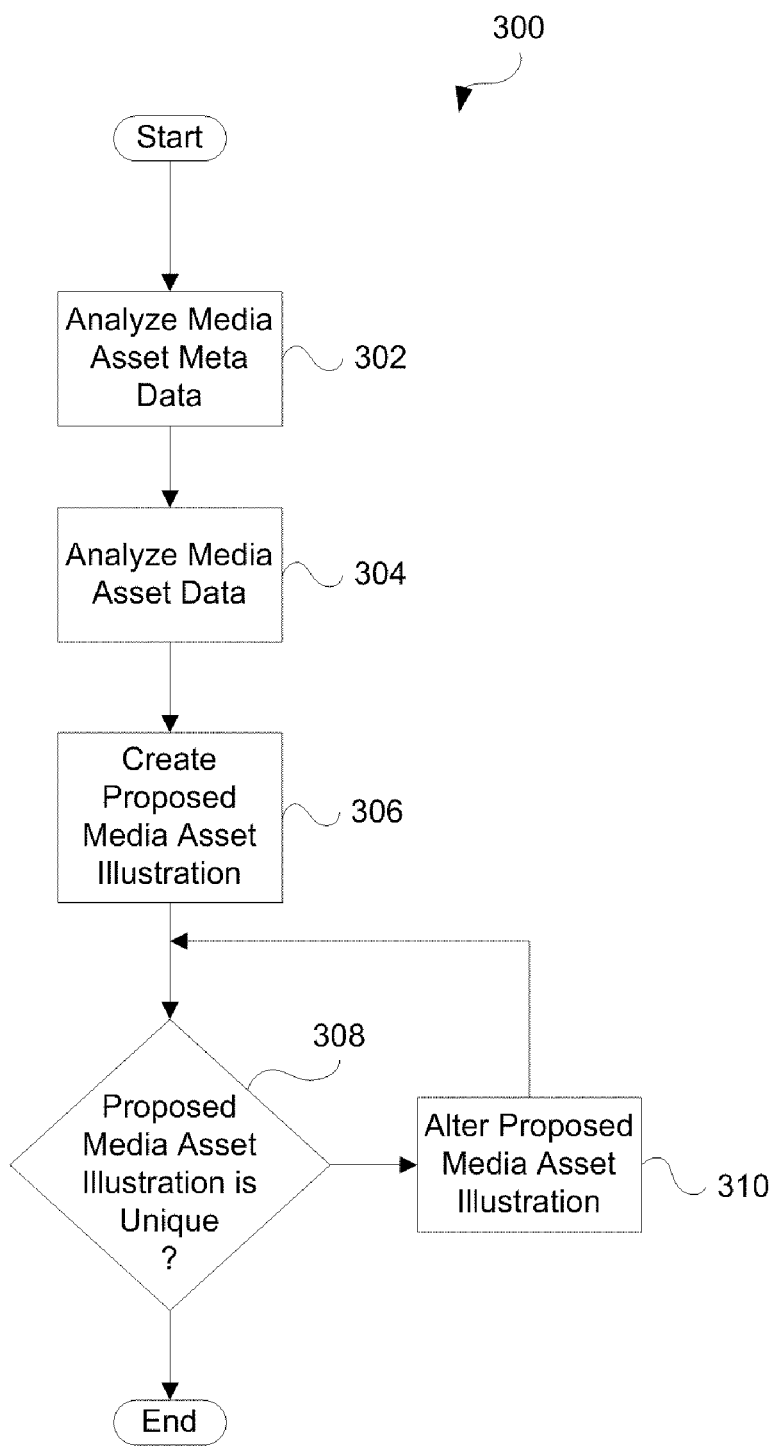
FIG. 3 is a flow diagram of a media asset illustration creation process according to one embodiment of the invention.

FIG. 3 is a flow diagram of a media asset illustration creation process 300 according to one embodiment of the invention. The media asset creation process 300 can, for example, occur during the creation 108 of a media asset in the substitute media asset creation process 100 in reference to FIG. 1 above. The media asset illustration creation process 300 operates on a group of one or more media assets, for instance a collection of music files stored on a personal computer.

The media asset creation process 300 begins by analyzing 302 the metadata of a media asset. The media asset can, for example, be a media asset 200 as described above in reference to FIG. 2. The analysis 302 can be of metadata embedded in a media asset (e.g. ID3 tags).

The media asset creation process 300 continues with an analysis 304 of the media asset data (i.e., the media content contained in a file, such as a MP3, AAC, or Quicktime® file) within a media asset. According to this embodiment, the media asset analysis 304 identifies the media asset by analyzing the media asset's media asset data (e.g., the media content) and performing media asset identification. For example, the media asset analysis 304 may compare the media asset data to other previously identified media assets and identify it by audio or visual comparisons or signatures. In this way, a media asset (even one having no metadata) can be analyzed and identified.

Alternately, according to one embodiment of the invention, the analysis 302 of the media asset metadata provides sufficient information for identification of the media asset and the analysis 304 of the media asset data need not be performed.

The proposed media asset creation process 300 continues with the creation 306 of a proposed media asset illustration. Next a decision 308 determines if the proposed media asset illustration is sufficiently unique in appearance. A wide variety of uniqueness criteria may be imposed. According to one embodiment of the invention, two media asset illustrations are unique (to each other) if a typical viewer can tell the two illustrations are different at a glance. If the decision 308 determines that the proposed media asset illustration is not unique according to the chosen criteria, then the media asset is altered 310 in order to make it sufficiently unique and the proposed media asset creation process 300 can return to perform the decision 308 and subsequent blocks.

If, on the other hand, the proposed media asset creation process 300 determines that the proposed media asset illustration process 300 is sufficiently unique, then the media asset creation process 300 ends.

Figure 4:
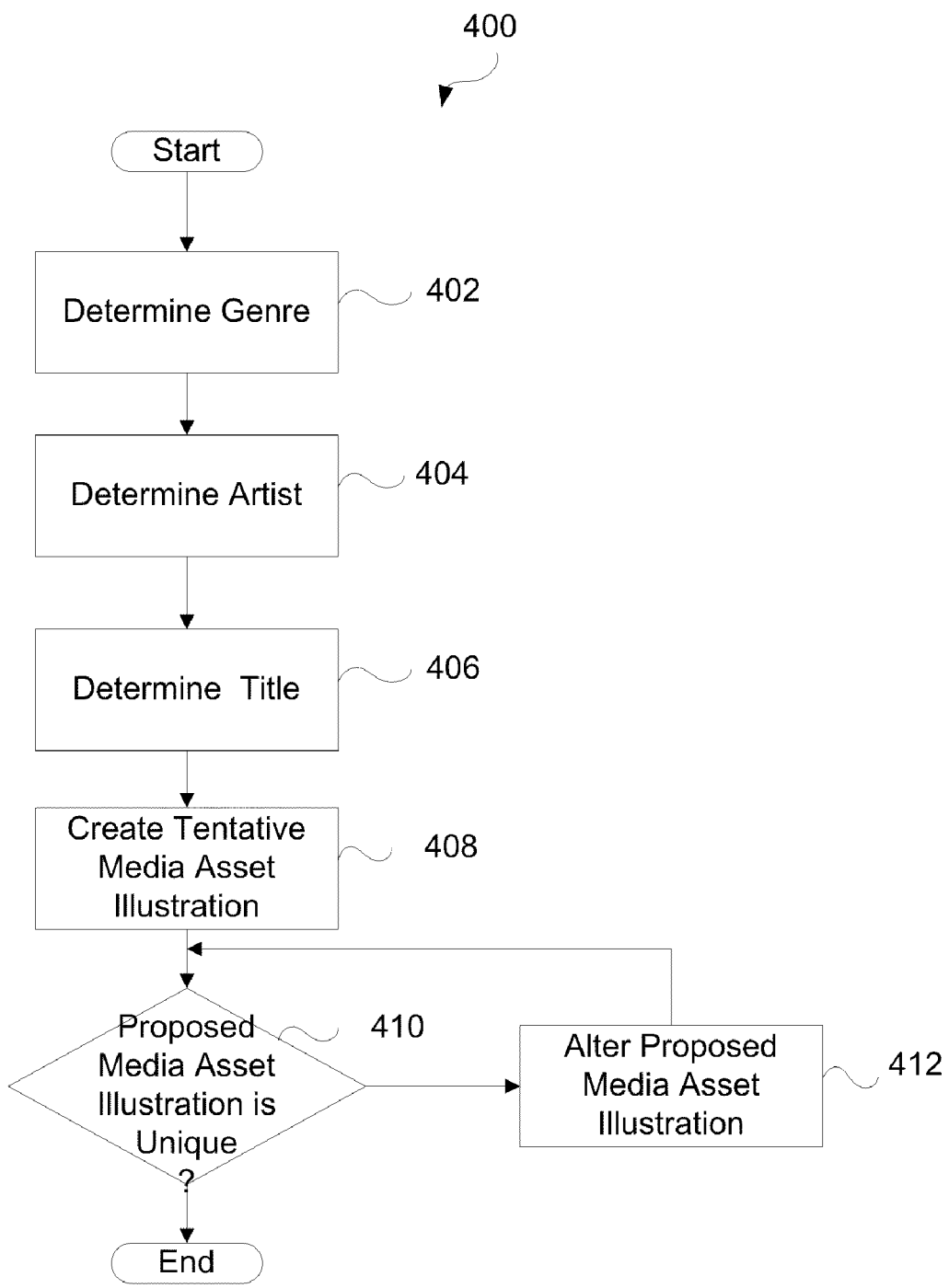
FIG. 4 is a flow diagram of a media genre-based media asset illustration creation process according to one embodiment of the invention.

FIG. 4 is a flow diagram of a media genre-based media asset illustration creation process 400 according to one embodiment of the invention. The media genre-based media asset illustration creation process 400 can correspond, for example, to the creation 108 of a media asset as discussed above in relation to FIG. 1. According to one embodiment of the invention, the media asset illustration produced by the media asset illustration creation process 400 gives a viewer of the media asset illustration visual cues as to the media genre, media artist, media title, and track title of the media asset. According to this embodiment, a media asset illustration will have a specific, predetermined layout or look depending on a set of design rules. For instance, all media asset illustrations associated with jazz recordings may have one layout, while all media asset illustrations associated with metal recordings may have another layout. Other design rules may depend on other factors, such as the tempo of a music track (e.g., Beats Per Minute (BPM)), or the artist/composer of a music track. Layout rules can include font styles and font sizes, color palettes, patterns, geometric shapes, among other common layout design features. Of course, other layout rules or schemes are possible. The design rules can be created such that media asset illustrations produced will be identical or similar to those generated using another media collection (e.g., another user's music collection).

According to one embodiment of the invention, the media genre-based media asset illustration creation process 400 uses information and/or data about a particular media asset in order to create a media asset illustration. Accordingly, the media genre-based media asset illustration creation process 400 determines 402 the media asset's genre. In the case of a music track, genre can include any music genre, from the general (e.g., jazz, classical, rock) to the specific (e.g., gothic industrial dance). The determining 402 of the media asset's genre can involve analyzing the metadata of a particular media asset. Next, the media genre-based media asset illustration creation process 400 determines 404 one or more of the artists, composers, directors, producers and/or stars of a particular media item. Next, the media genre-based media asset illustration creation process 400 determines 406 the title of the media asset. For example, in the case of a music track, the title can be the album title and/or the song title. Next, a proposed media asset illustration is created 408 according to a set of predetermined layout rules. In an alternative embodiment, the creation 408 of a proposed media asset illustration can be random.

Once a proposed media asset illustration has been created 408, a decision 410 determines if the proposed media asset illustration is sufficiently unique. In one embodiment, uniqueness is desirable since a viewer may want to be able to tell which media item he is looking at glance. In one embodiment, for a proposed media asset illustration to be sufficiently unique, it should be apparent to a typical viewer's eye that two illustrations are different. Uniqueness criteria are formulated according to design decisions and may vary according to various embodiments of the invention. Uniqueness can, for example, be determined by comparing the proposed media asset illustration to some subset of a collection of media asset illustrations, for example, the media asset illustrations contained in a music collection. Varying degrees of uniqueness are possible. For instance, according to one embodiment of the invention, all songs on a music album can have the same illustration, while different albums by the same artist can have different illustrations.

If decision 410 determines that a proposed media asset illustration is not sufficiently unique, then the proposed media asset is altered 412 according to a predetermined set of layout rules. Once the proposed media asset illustration has been altered, the media asset illustration returns to decision 410 and subsequent blocks. On the other hand, if decision 410 determines that the proposed media asset is sufficiently unique, then the media genre-based media asset illustration creation process 400 ends.

In another embodiment, the media genre-based asset illustration creation process 400 can use other bases besides genre in creating media asset illustrations. The other bases can include artist-based and/or title-based media asset illustration creation.

According to one embodiment of the invention, the media genre-based media asset illustration process 400 can be deterministic, that is, for two identical sets of media assets analyzed in the same order on different computers, a generated media asset will be identical on both computers. Thus, color schemes, fonts, patterns, and other features of a created media asset illustration will be predictable based on the analysis of the media asset. In embodiments where uniqueness criteria have been set, small predictable variations within created media asset illustrations may occur.

According to one embodiment of the invention (not shown) substitute media asset illustrations, for example, substitute media asset illustrations created as described in reference to FIG. 1, can be stored as text files in a markup language such as XML or converted to digital image files (e.g., JPEG or GIF files.) Image files can then be downloaded for display on a portable media player such as an iPod® media player available from Apple Computer, Inc.

Figure 5:
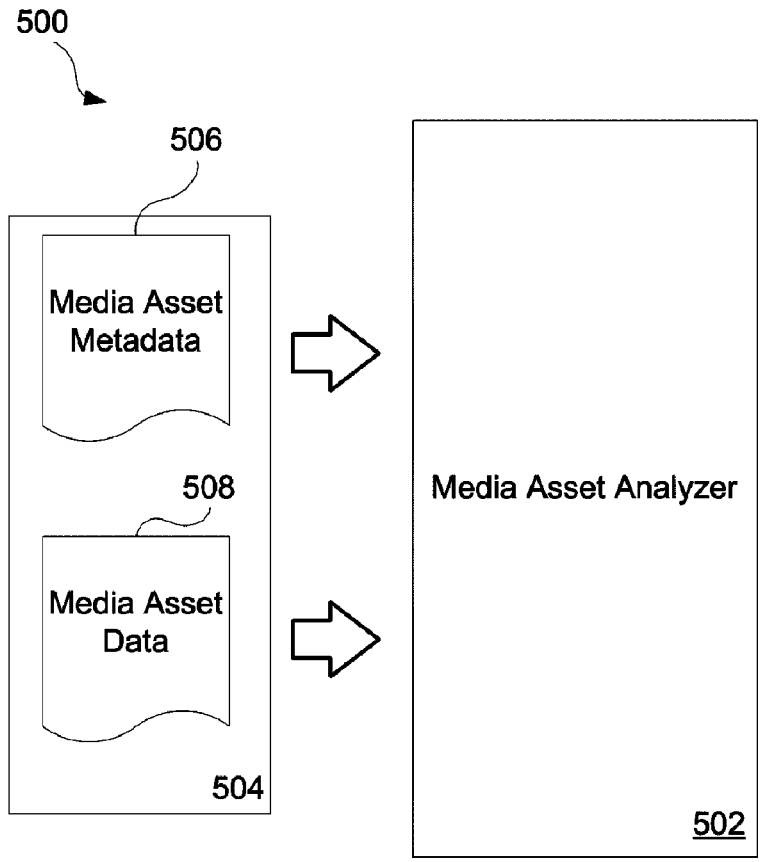
FIG. 5 illustrates an example of a media asset illustration generator according to one embodiment of the invention.
Figure 5:
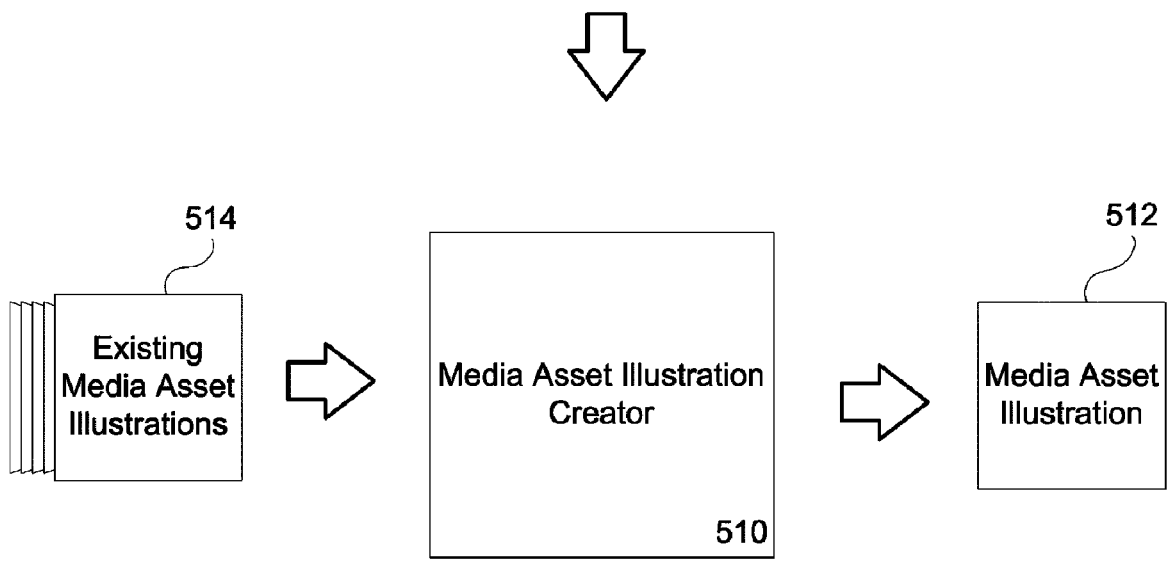

FIG. 5 illustrates an example of a media asset illustration generator 500 according to one embodiment of the invention. The media asset illustration generator 500 can be used to generate media assets as described in reference to FIGS. 1, 3, and 4. Media asset illustration generator 500 can be implemented in hardware or software as needed.

The media asset illustration generator 500 includes a media asset analyzer 502, which analyzes a media asset 504 in order to determine how to generate a media asset illustration that will represent the media asset.

In order to analyze the media asset 504, the media asset analyzer 502 analyzes the media asset 504, including the media asset's 504 metadata 506 (e.g., ID3 tags in an MP3 file), and/or the media asset's 504 media asset data 508 (e.g.

media content). The media asset analyzer 502 determines one or more of the media asset's 504 genre, title, artist title, genre, or other identifying information (e.g., publisher, director, writer). According to one embodiment of the invention, where the media asset 504 is a music file, the media asset analyzer 502, determines the media asset's 504 genre, title, and artist by examining the media asset metadata 506. According to another embodiment of the invention, the media asset analyzer 502 identifies the media asset by analyzing the media asset's 504 media asset data 508 (i.e., the media content contained in a media file, and performing media asset identification. For example, the media asset analyzer 502 may compare the media asset data 508 to other previously identified media assets and identify it by audio or visual comparisons or signatures. In this way, a media asset 504 that has no metadata 506 can be analyzed and identified.

Once the media asset 504 has been analyzed by the media asset analyzer 506, an media asset illustration creator 510 creates a media asset illustration 512, taking into account other existing media asset illustrations 514. In this way, the media asset illustration creator 510 ensures that the created media asset illustration 512 is not an exact duplicate of a previously existing media asset. As noted above in reference to FIG. 4, for the media asset illustration 512 to be sufficiently unique, it should be apparent to a typical viewer's eye that two illustrations are different. Uniqueness criteria are formulated according to design decisions and may vary according to various embodiments of the invention. Uniqueness is determined by comparing the media asset 512 illustration to existing media asset illustrations 514, for example, the media asset illustrations contained in a music collection. Varying degrees of uniqueness are possible. For instance, according to one embodiment of the invention, all songs on a music album can have the same illustration, while different albums by the same artist can have different illustrations.

In one embodiment of the invention, the created media asset illustration is the result of a deterministic process, such as described above in reference to FIG. 4.

Figure 6A:
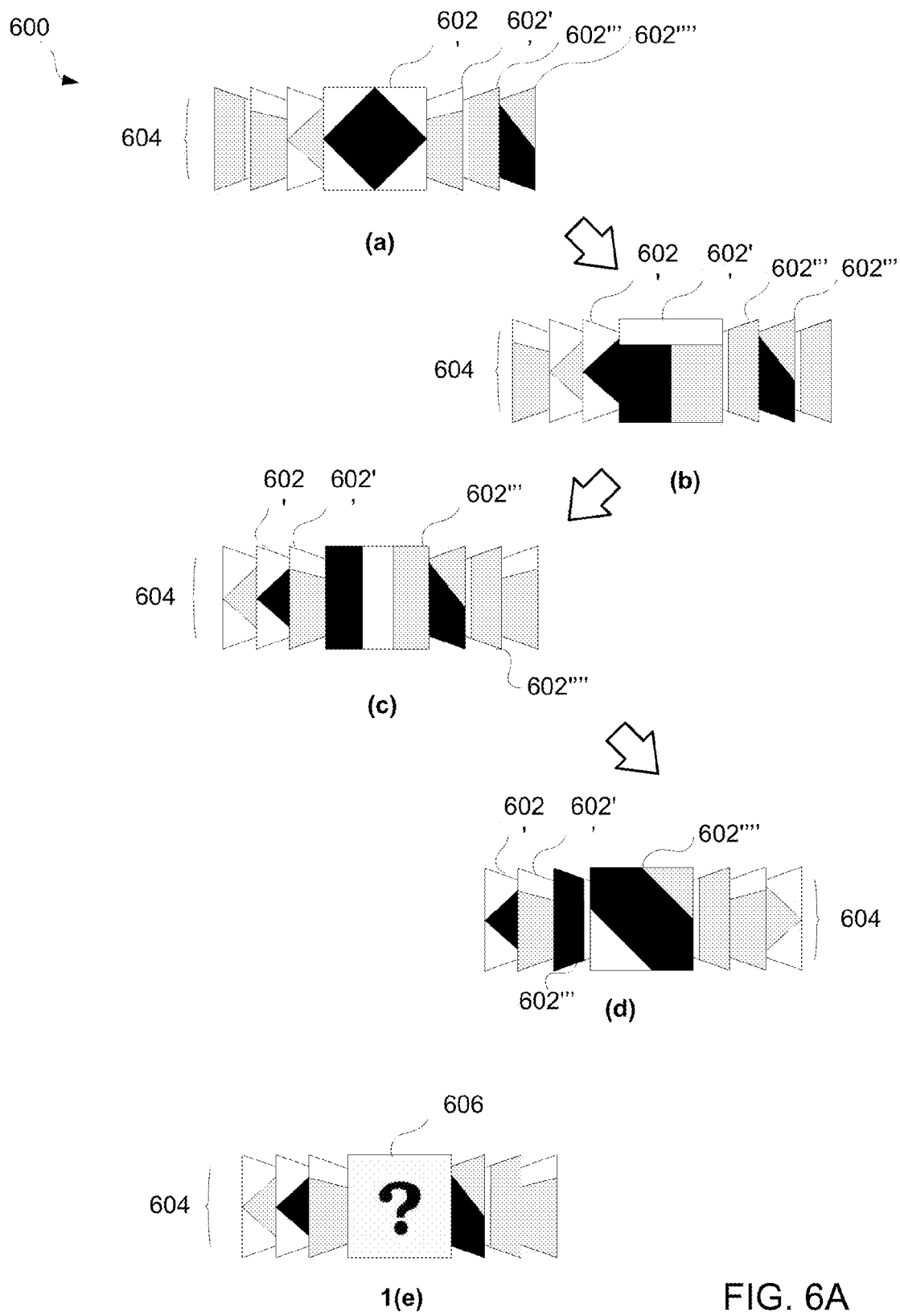
FIG. 6A illustrates an example of a media asset organizational scheme based on media asset illustrations according to one embodiment of the invention.

FIG. 6A illustrates an example of a media asset organizational scheme 600 based on media asset illustrations according to one embodiment of the invention. Thus, the media asset illustration stack 604 can be browsed by a user. When a user of a media asset management program, for example iTunes®, wishes to browse through a collection of media assets, he may choose to do so by browsing through media asset illustrations. This media asset illustration browsing process is analogous to flipping through a stack of LP records or CDs in a record store.

In FIG. 6A, states (a)-(d), a collection of media asset illustrations 602 are shown in a media asset illustration stack 604. In this example, seven media asset illustrations 602 are shown in the media asset illustration stack 604, each with a unique design. For illustration purposes, four media asset illustrations 602'-602'''' are shown. However, any number of media asset illustrations can be included in the media asset illustration stack 604. The media asset illustration stack 604 can represent, for example, a set of album cover illustrations associated with a collection of music files as described above in reference to FIG. 2. This is illustrated by showing four different media asset illustrations 602 in states (a)-(d). In state (a) a media asset illustration 602' is fully visible. Thus the user can see the complete media asset illustration 602', while the other media asset illustrations 602 are partially visible. Next, in state (b), as the user moves to the next media asset illustration 602'' in the media asset stack 604, the previously viewed media asset illustration 602' shifts to the left and becomes partially visible. In states (c) and (d), the media assets illustrations 602 are shifted left twice more, this time bringing media asset illustrations 602''' and 602'''' to the front, respectively. Of course, the user may move back and forth in the stack as desired, in either direction, sequentially or by skipping over one or more media asset illustrations 602.

The media asset illustration stack 604 can be used, for example, in a media management application such as iTunes® to provide a user with visual cues in order to identify a particular media asset (e.g. a music file) by looking at an illustration that accompanies one or more media asset files in the user's media asset collection. Note that the media assets are not limited to music files. Other file types such as video, text, digital photographs and/or illustrations, and electronic books, can be represented by media asset illustrations.

By way of illustration state (e) is shown with a media asset illustration stack 604 including a placeholder media asset illustration 606. The placeholder media asset illustration 606 is included when there is a media asset in a media asset collection that does not have media asset illustration. As noted above, many music files (e.g., MP3 or AAC files) have album cover art embedded in the headers of the music file, typically JPEG images of CD jewel case inserts or LP record covers. Also motion picture, television, and music video files can have promotional stills or movie poster art embedded within the files. Regardless of the media asset type, the media asset illustrations can be viewed by a user in a media management application such as iTunes® running on a personal computer or on a portable media player, such as an iPod®. If, however, a media asset does not have an associated media asset illustration 602, then a placeholder media asset illustration 606 can be included so a user will know that there are media assets in his collection that do not have associated media asset illustrations 602, and so that the user may browse his entire media asset collection, not just those with associated media asset illustrations. Note that, in the media asset organizational scheme 600, media assets that do not have associated media asset illustrations 602 can be represented with one or more placeholder media asset illustrations 606 in the media asset illustration stack 604. In order to mitigate the problem of missing media asset illustrations, a process such as the substitute media asset illustration process 100 described above in reference to FIG. 1 may be used.

Figure 6B:
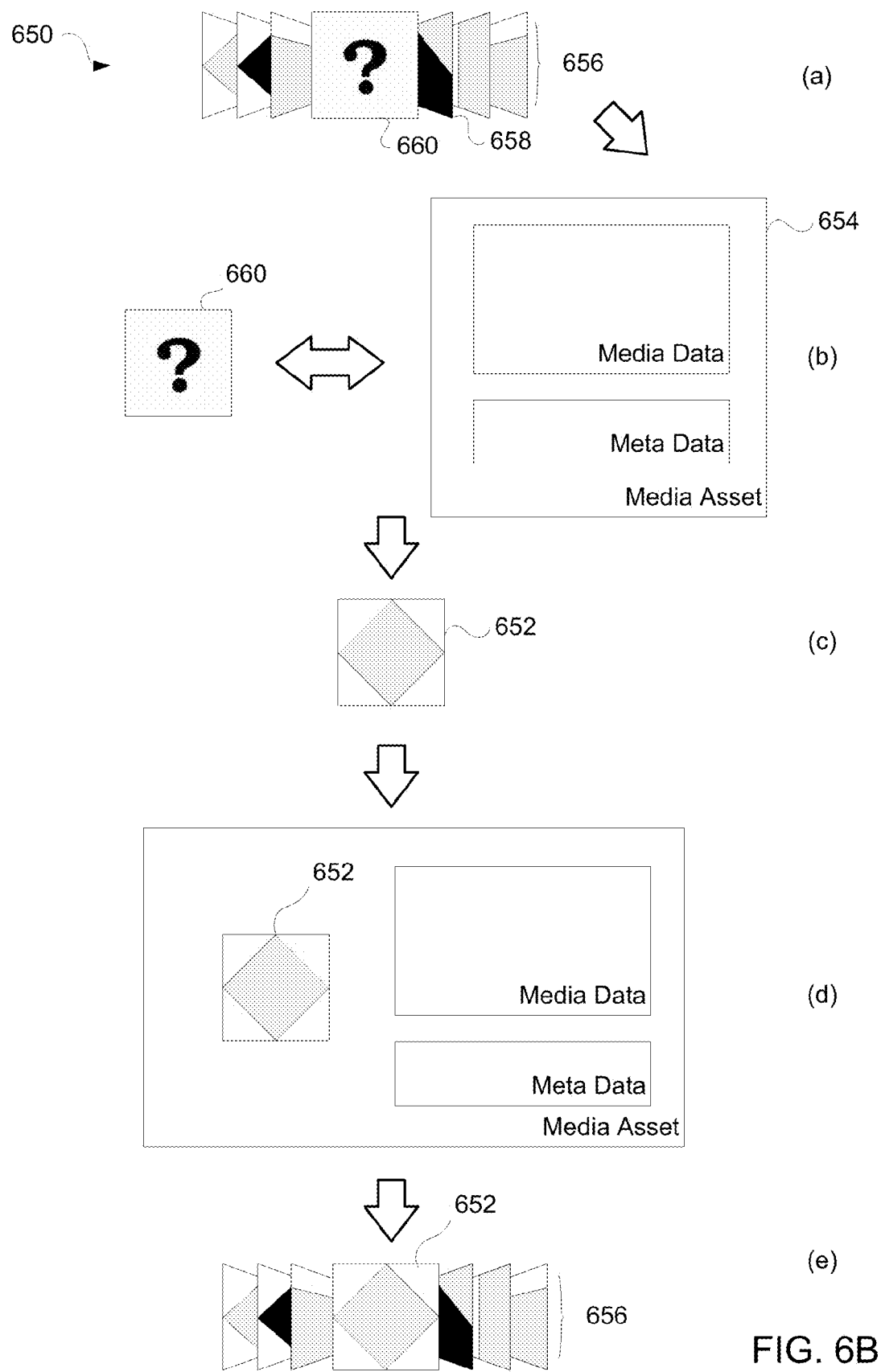
FIG. 6B illustrates an example of adding a substitute media asset illustration to a media asset.

FIG. 6B illustrates an exemplary substitute media asset illustration creation process 650, wherein a substitute media asset illustration 652 is inserted into to a media asset 654. The substitute media asset illustration creation process 650 can, for example, correspond to the substitute media asset illustration process 100 described above in reference to FIG. 1. The media asset 654 is described further above in reference to the media asset 200 of FIG. 2.

In step (a), a media asset illustration stack 656 is shown. The media asset illustration stack 656 contains one or more media asset illustrations 658 and at least one media asset illustration placeholder 660. Next, in step (b), the media asset 654 that is associated with the media asset illustration placeholder 660 is identified. Next, in step (c) the substitute media asset illustration is generated, for example, by the substitute media asset illustration creation process 100 described above in reference to FIG. 1. In step (d), the substitute media asset 652 is associated with the media asset 654. Step (d) shows the substitute media asset illustration 652 inserted into a data segment within the media asset 654. However, the association can be accomplished by using a software pointer and by other methods. Finally, in step (e) the substitute media asset illustration 652 is shown in the media asset illustration stack 656, having replaced the placeholder media asset illustration 658.

Figure 7:
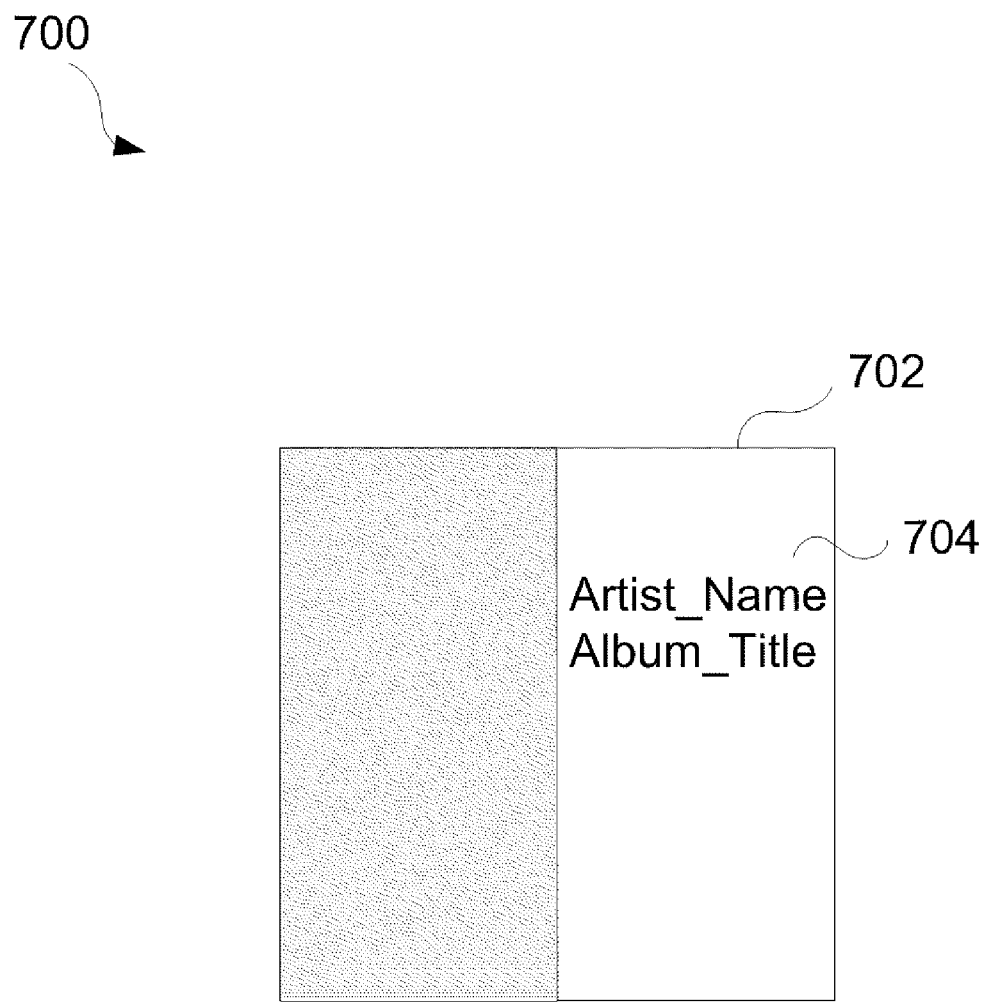
FIG. 7 illustrates an example of a substitute media asset illustration according to one embodiment of the invention.

FIG. 7 illustrates an example of a substitute media asset illustration 700 according to one embodiment of the invention. The substitute media asset illustration 700 can be used, for example, with various embodiments described above in reference to FIGS. 1-6.

The substitute media asset 700 includes graphics 702 and text 704. The text may be extracted from metadata or media headers as described above, for example, in reference to FIGS. 3 and 4. Alternately, the text may be generated by a media identification process, such as by a process applied by the media asset analyzer 502 described in reference to FIG. 5.

The graphics 702 can be generated randomly, or have a specific, predetermined layout or look depending on a set of design rules. For instance, all media asset illustrations associated with jazz recordings may have one layout, while all media asset illustrations associated with metal recordings may have another layout. Other design rules may depend on other factors, such as the tempo of a music track (e.g., Beats Per Minute (BPM)), or the artist/composer of a music track. Layout rules can include font styles and font sizes, color palettes, patterns, geometric shapes, music band logos, and record company logos, among other common layout design features. Of course, other layout rules or schemes are possible. The design rules can be created such that the media asset illustration 700 will be identical or similar to those generated using another media collection (e.g., another user's music collection).

Figure 8:
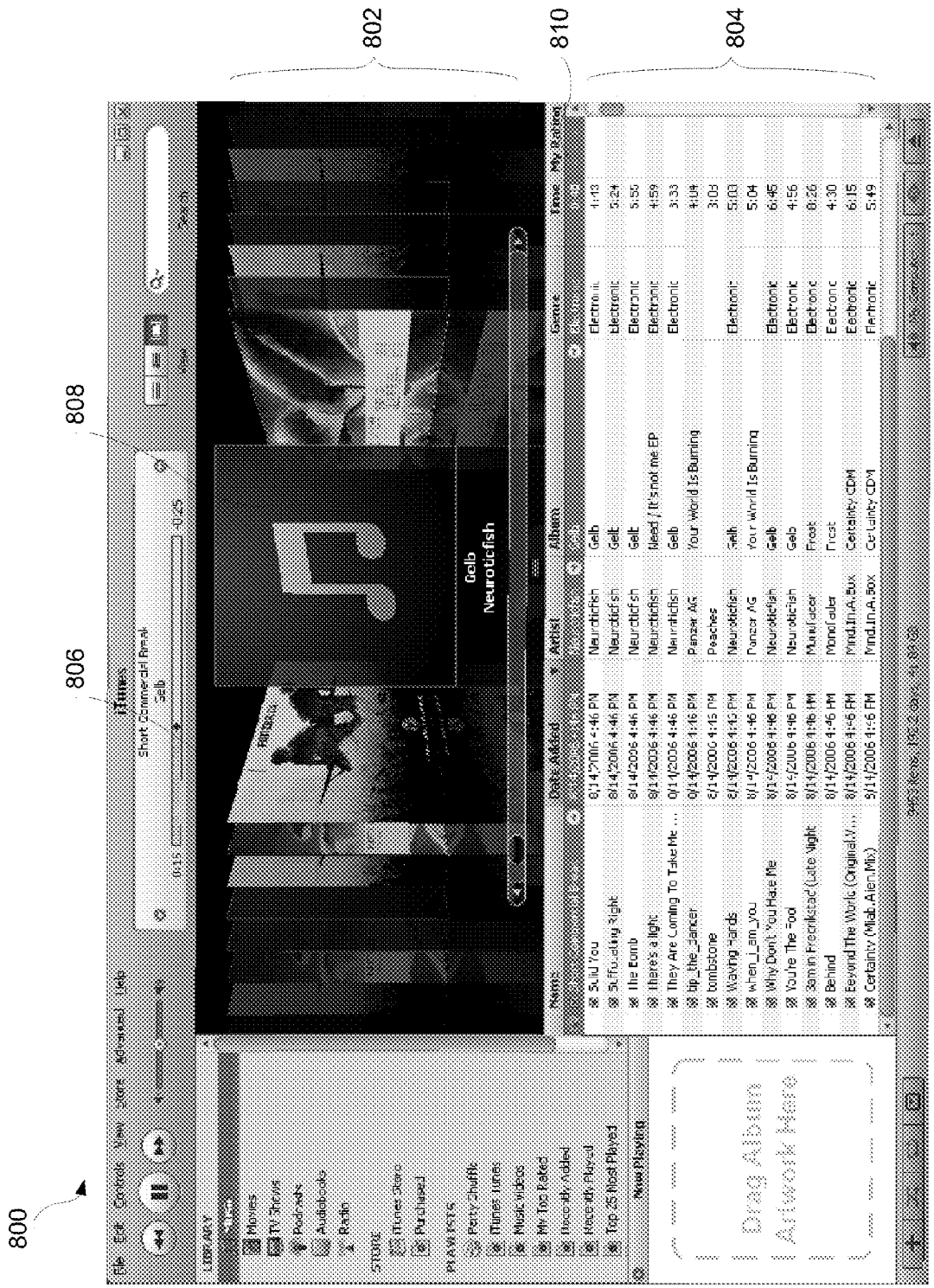
FIG. 8 is a screenshot of an iTunes® window showing a user interface for browsing media assets using media asset illustrations.

FIG. 8 is a screenshot 800 of an iTunes® window showing a user interface for browsing media assets using media asset illustrations.

The screenshot 800 includes several panes, including a media illustration stack pane 802 (containing various media asset illustrations 806 and a placeholder media asset illustration 808) and a media asset listing pane 804. Other panes are visible but are not described. Viewing media asset illustrations 806 in the media asset illustration stack pane 802 is accomplished in a similar manner as viewing media asset illustrations 602 in media asset illustration stack 604 as described above in reference to FIG. 6A.

In the media asset illustration stack pane 802, media asset illustrations 806 are shown partially obscured. However, the placeholder media asset illustration 808 is shown in full. The placeholder media asset 808 informs the iTunes® user that there is no media asset illustration associated with the currently selected song 810 being visually identified. A substitute media asset illustration (not shown) may be created using one or more embodiments as described above in reference to FIGS. 1-7.

The above-described processing can be performed by a computing device. As one example, the computing device can be a personal computer. As another example, the computing device can be a portable media device (e.g., potable media player).

Figure 9:
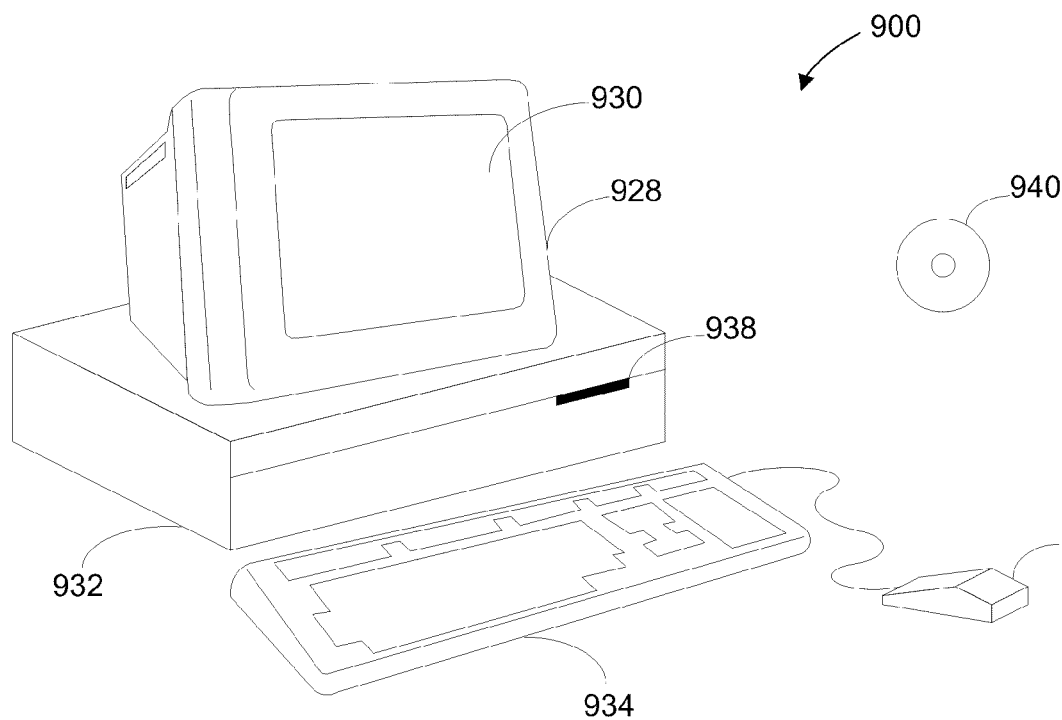
FIG. 9 shows an exemplary computer system suitable for use with the invention.

FIG. 9 shows an exemplary computer system 900 suitable for use as a computing device (e.g., client machine) according to one embodiment of the invention. The computer system 900 is capable of creating and/or displaying media asset illustrations. The computer system 900 includes a display monitor 928 having single or multi-screen displays 930 (or multiple displays), cabinet 932, keyboard 934, and mouse 936. Cabinet 932 houses a drive 938, such as a CD-ROM, or floppy drive, system memory and a hard drive (not shown) which may be utilized to store and retrieve software programs incorporating computer code that implements the present invention, data for use with the invention, and the like. Although CD-ROM 940 is shown as an exemplary computer readable storage medium, other computer readable storage media including CD-ft CD-RW, DVD, DVD-R, DVD-RW, floppy disk, tape, flash memory, system memory, and hard drive may be utilized. Additionally, a data signal embodied in a carrier wave (e.g., in a network including the Internet) may be the computer readable storage medium. In one implementation, an operating system for the computer system 900 is provided in the system memory, the hard drive, the CD-ROM 940 or other computer readable storage medium and serves to incorporate the computer code that implements the invention.

Figure 10:
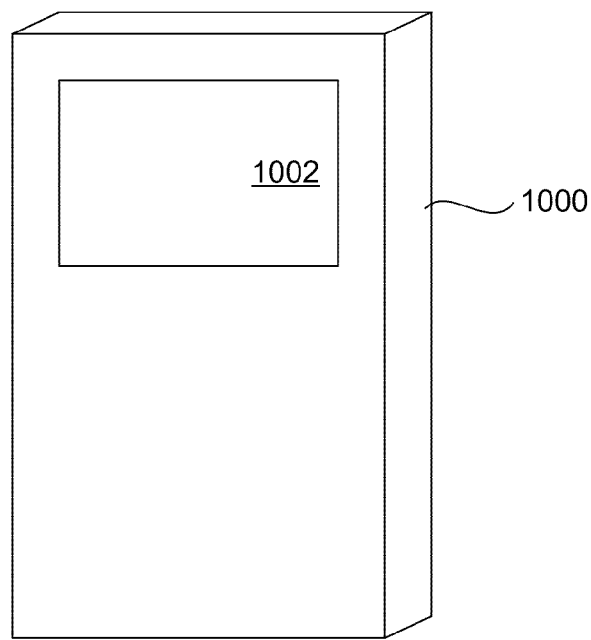
FIG. 10 is a diagram of a portable electronic device according to one embodiment of the invention.

FIG. 10 is a diagram of a portable electronic device 1000 according to one embodiment of the invention. The portable electronic device 1000 is capable of creating and/or displaying media asset illustrations on a display device 1002. The portable electronic device 1 includes a housing having the display device 1002 and one or more user input devices (not shown) on a front, side, and/or back surface of the housing. The user input devices can, for example, include one or more buttons, dials, touch-sensitive surfaces, keypads, switches, etc. The one or more user input devices enable a user of the portable electronic device 1000 to provide user inputs to the portable electronic device 1000. For example, the user input devices can enable the user to navigate through media asset illustrations. Additionally, internal to the housing of the portable electronic device are various software or electrical components in support of the image browsing function and other functions.

Generally, a media asset is a digital media file. Digital media files include electronic files for music, video, text, digital photographs and/or illustrations, and electronic books, among other types. Specific familiar media asset formats include AAC, MP3, MP4, AVI, JPEG, GIFF, and many others.

Additional details on usage of media asset illustrations, such as for media assets selection or browsing, are provided in (i) U.S. Provisional Patent Application No. 60/843,832, filed Sep. 11, 2006, entitled "TECHNIQUES AND SYSTEMS FOR BROWSING MEDIA CONTENT," which is herein incorporated by reference; (ii) U.S. patent application Ser. No. 11/519,460, filed Sep. 11, 2006, entitled "MEDIA MANAGER WITH INTEGRATED BROWSERS," which is herein incorporated by reference; and (iii) U.S. Provisional Patent Application No. 60/878,746, filed Jan. 5, 2007, entitled "ELECTRONIC DEVICE WITH IMAGE BASED BROWSING," which is herein incorporated by reference.

U.S. patent application Ser. No. 11/078,583, filed on Mar. 11, 2005 and entitled "AUTOMATED CREATION OF MEDIA ASSET ILLUSTRATION COLLAGE", and is hereby incorporated herein by reference. U.S. patent application Ser. No. 11/138,004, filed on May 25, 2005 and entitled "ONLINE PURCHASE OF DIGITAL MEDIA BUNDLES", and is hereby incorporated herein by reference. U.S. patent application Ser. No. 11/247,974, filed on Oct. 10, 2005 and entitled "ONLINE PURCHASE OF DIGITAL MEDIA BUNDLES HAVING INTERACTIVE CONTENT", and is hereby incorporated herein by reference.

The advantages of the invention are numerous. Different embodiments or implementations may, but need not, yield one or more of the following advantages. One advantage of an embodiment of the present invention is that media asset illustrations, namely, color media asset illustrations, may be created without user input (i.e., automatically by a computing device). Another advantage of the invention is that media assets illustrations can be created predictable and reproducible manner according to set design criteria. Another advantage is that users will be able to see genre, title, artist, and other pertinent information of a media asset at a glance, having noted that all media asset illustrations of that particular genre will have media asset illustrations created according to genre based rules. Still another advantage is the elimination of 'placeholder' graphics in media asset management programs as well as other programs that rely on a user browsing through media asset illustrations in order to select a particular media asset from a collection of media assets.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for producing a media asset illustration, the method being performed by a computing device, and the method comprising:
    determining if a media asset contains a media asset illustration;
    creating a media asset illustration for the media asset if the determining determines that the media asset does not contain a media asset illustration; and
    associating the created media asset illustration with the media asset,
    wherein the creating of a media asset illustration for the media asset further comprises analyzing media asset metadata for the media asset.

2. A computer-implemented method as recited in claim 1, wherein a media asset illustration is created based on the analysis of the media asset metadata.

3. A computer-implemented method as recited in claim 1, wherein a media asset illustration is created based on the analysis of the media asset data.

4. A computer-implemented method as recited in claim 1, wherein the analysis of the media asset metadata is based upon determining the genre under which a media asset is categorized.

5. A computer-implemented method as recited in claim 1, wherein the analysis of the media asset metadata is based upon determining the name of the artist who created the media asset.

6. A computer-implemented method as recited in claim 1, wherein the analysis of the media asset metadata is based upon determining the title of the media asset.

7. A computer-implemented method as recited in claim 1, wherein the determining if a media asset contains a media asset illustration is done by scanning the ID3 tags of a media asset file having the media asset.

8. A computer-implemented method as recited in claim 1, wherein the created media asset illustration is compared to a group existing media asset illustrations and rejected unless it is sufficiently unique from the other media asset illustrations in the group.

9. A computer-implemented method as recited in claim 1, wherein a media asset file having the media asset has a file type selected from the group consisting of:
    an MP3 file, an AAC file, and a video file.

10. A computer-implement method as recited in claim 1, wherein the creating of the media asset illustration is deterministic.

11. A computer-implemented method as recited in claim 1, wherein the media asset is one or more of an audio asset, a video asset or an image asset.

12. A non-transitory computer readable medium including computer program code for producing a media asset illustration, the computer readable medium comprising:
    computer program code for determining if a media asset has a media asset illustration already associated therewith;
    computer program code for creating a media asset illustration for the media asset if the computer program code for determining determines that the media asset does not have a media asset illustration already associated therewith; and
    computer program code for associating the created media asset illustration with the media asset,
    wherein the computer program code for creating the media asset illustration for the media asset comprises computer program code for analyzing metadata of the media asset.

13. A computer readable medium as recited in claim 12, wherein the computer program code for creating the media asset illustration comprises computer program code for analyzing the media asset data.

14. A computer readable medium as recited in claim 12, wherein the computer program code for creating the media asset illustration comprises computer program code for analyzing the media asset to determine the genre under which the media asset is categorized.

15. A computer readable medium as recited in claim 14, wherein the created media asset illustration is dependent on the genre of the media asset.

16. A computer readable medium as recited in claim 12, wherein the created media asset illustration is compared to a group existing media asset illustrations and rejected unless it is sufficiently unique from the other media asset illustrations in the group.

17. A computer readable medium as recited in claim 12, wherein the computer program code for creating the media asset illustration comprises computer program code for analyzing the media asset to determine the name of the artist who created the media asset.

18. A computer readable medium as recited in claim 12, wherein the computer program code for creating the media asset illustration comprises computer program code for analyzing the media asset to determine the title of the media asset.

19. A computer readable medium including computer program code for producing a media asset illustration, the computer readable medium comprising:
    computer program code for determining if a media asset has a media asset illustration already associated therewith;
    computer program code for creating a media asset illustration for the media asset if the computer program code for determining determines that the media asset does not have a media asset illustration already associated therewith; and
    computer program code for associating the created media asset illustration with the media asset,
    wherein the media asset includes media asset data, and
    wherein the computer program code for creating the media asset illustration for the media asset comprises computer program code for analyzing the media asset data.

20. A computing device, comprising:
    a memory device configured to store at least computer program code; and
    a processing device operatively connected to the memory device for executing the computer program code,
    wherein the computer program code includes at least (i) computer program code for determining if a media asset has a media asset illustration already associated therewith, (ii) computer program code for creating a media asset illustration for the media asset if the computer program code for determining determines that the media asset does not have a media asset illustration already associated therewith, and (iii) computer program code for associating the created media asset illustration with the media asset,
wherein the media asset includes media asset data, and wherein the computer program code for creating the media asset illustration for the media asset comprises computer program code for analyzing the media asset data.

\* \* \* \* \*